UNITED STATES PATENT OFFICE.

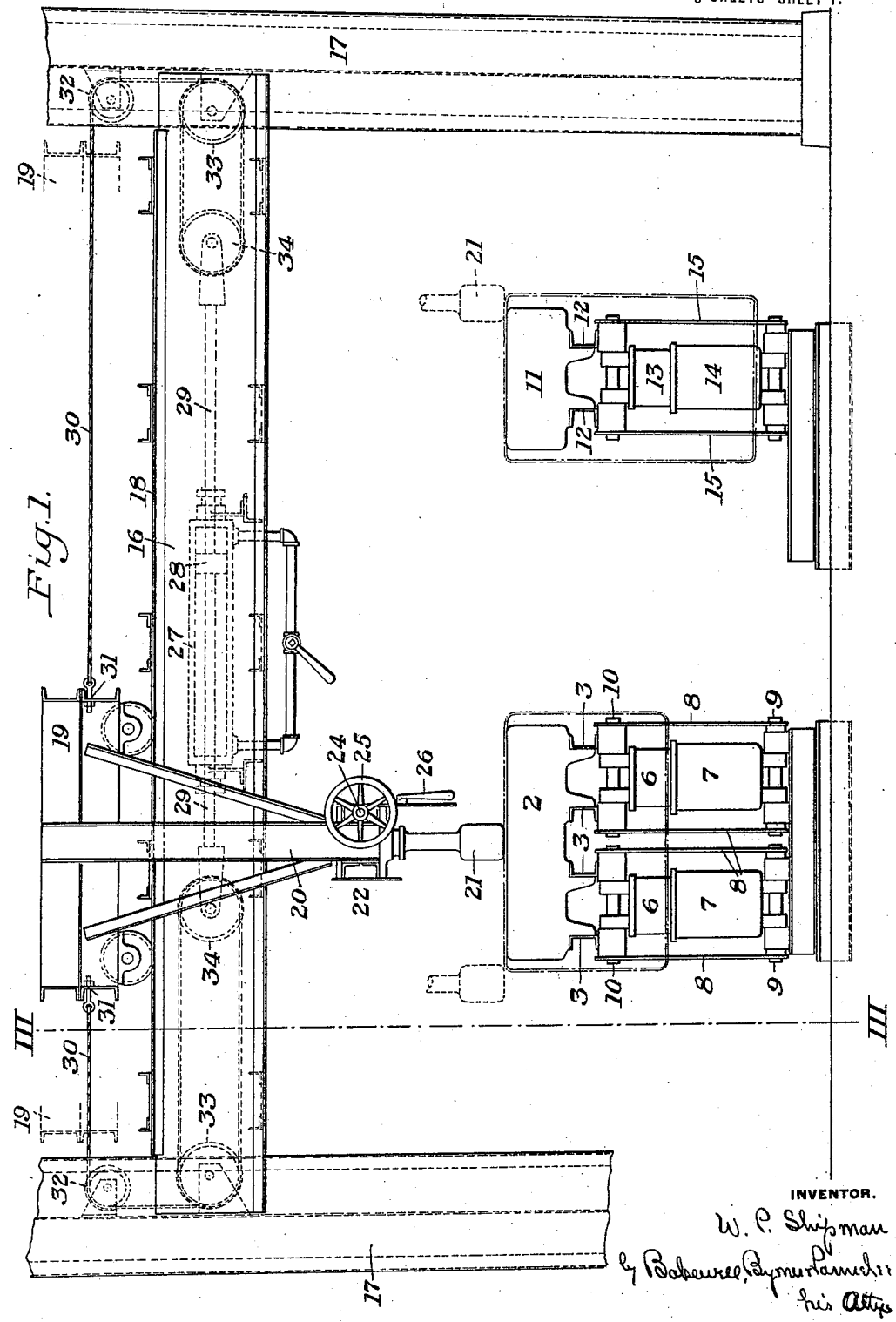

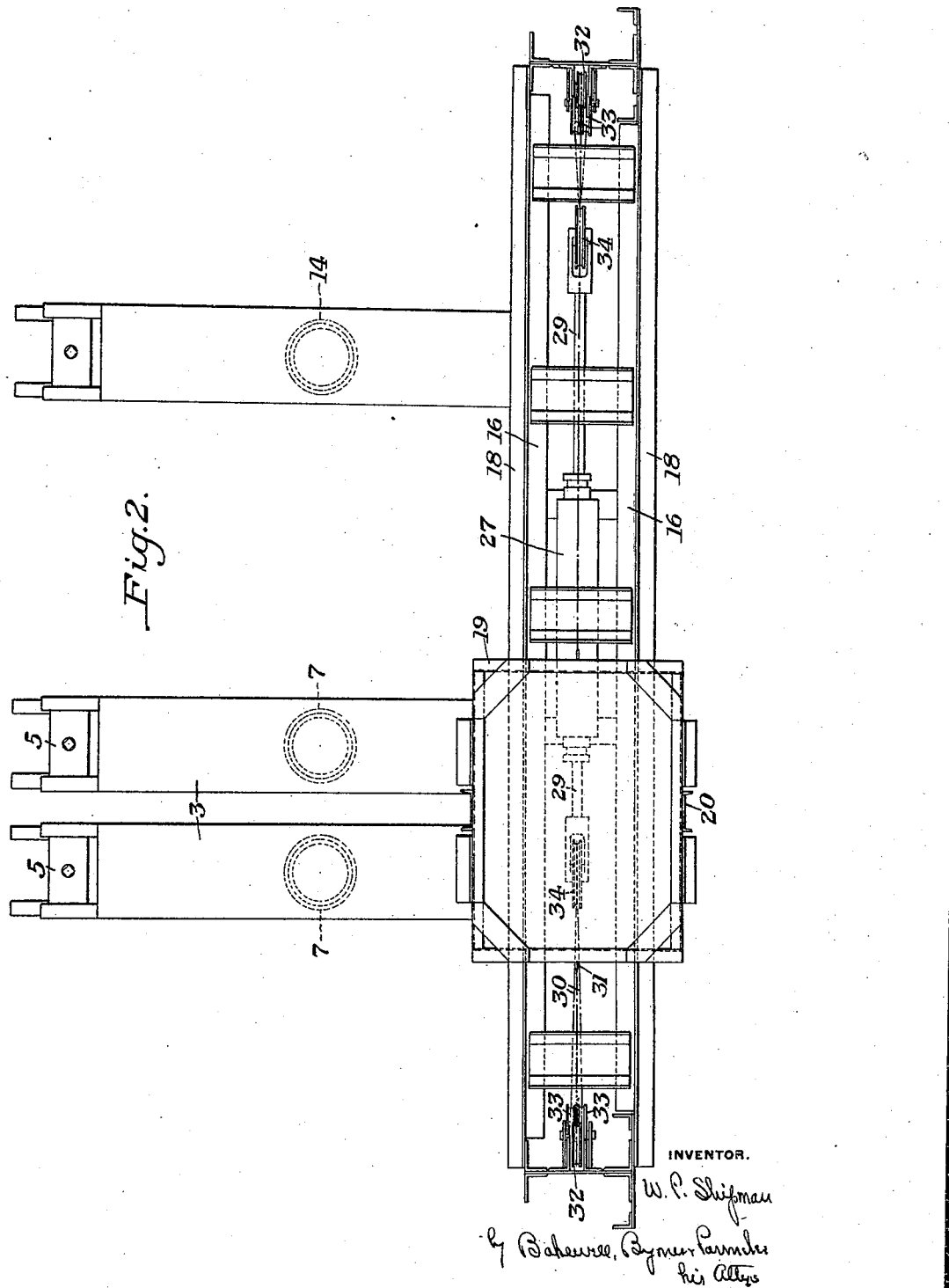

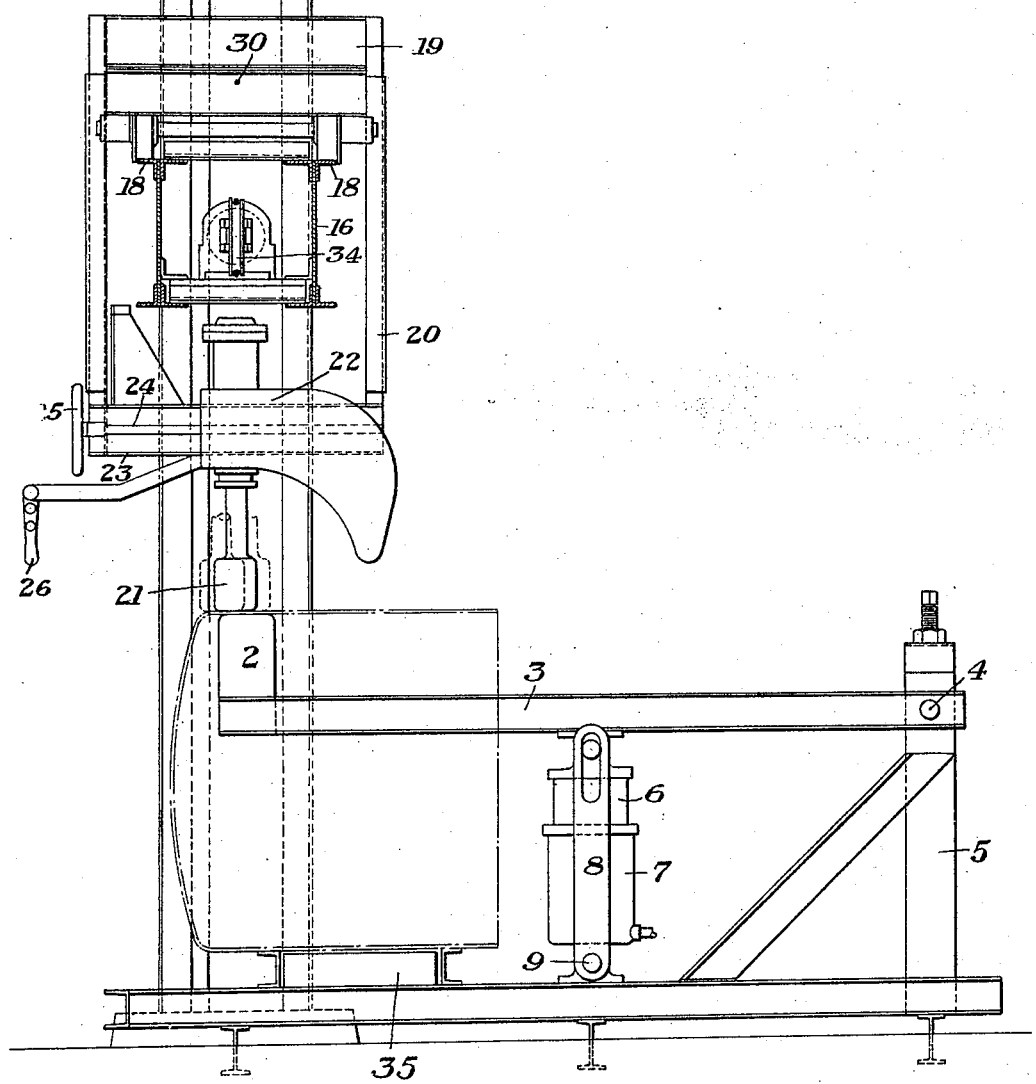

WILLIAM P. SHIPMAN, OF PITTSBURGH, PENNSYLVANIA, ASSIGNOR TO BLAW-KNOX COMPANY, OF HOBOKEN, PENNSYLVANIA, A CORPORATION OF NEW JERSEY.

WELDING APPARATUS.

1,412,066.      Specification of Letters Patent.      Patented Apr. 11, 1922.

Application filed January 13, 1921. Serial No. 436,901.

*To all whom it may concern:*

Be it known that I, WILLIAM P. SHIPMAN, residing at Pittsburgh, Allegheny County, Pennsylvania, have invented a new and useful Improvement in Welding Apparatus, of which the following is a full, clear, and exact description, reference being had to the accompanying drawings, forming part of this specification, in which—

Figure 1 is a front elevation, partly broken away, of a welding apparatus embodying my invention;

Figure 2 is a top plan view of the same; and

Figure 3 is a section on the line III—III of Figure 1.

My invention has relation to welding apparatus, and more particularly to apparatus which has been especially designed for use in the manufacture of large sheet metal vessels or receptacles, such as annealing boxes and the like.

The object of the invention is to provide apparatus of this character by means of which the work can be rapidly and thoroughly done, and in which the amount of manual labor required is reduced to a minimum.

The particular nature of my invention will be best understood by reference to the accompanying drawings, in which I have shown a preferred embodiment thereof, and which will now be described, it being premised, however, that various changes can be made in the details of construction, arrangement and combination of the several parts, without departing from the spirit and scope of my invention as defined in the appended claims.

The form of my invention which is illustrated in the accompanying drawings has been particularly designed for use in welding the top to the body portions of sheet metal annealing boxes. For such purposes, I prefer to provide the apparatus with two different anvils, one of these anvils being used in welding the longer dimensions of the boxes, while the other is used in welding the shorter dimensions. I have shown the longer anvil 2 as mounted upon the free end portions of beams 3 which are pivoted at their opposite end portions, at 4, to suitable supports 5. Each pair of these beams, at an intermediate portion of their length, is carried upon the plunger 6 of a power cylinder 7, the two power cylinders being designed to be actuated in unison to raise and lower the anvil 2 to and from its operative position. For the purpose of limiting the stroke of the plunger 6, I provide slotted links 8 pivoted at 9 at their lower ends and having their slots engaging pins 10 on the plunger.

The shorter anvil 11 is arranged at one side of the longer anvil 2 and is carried upon a single pair of beams 12, similar to one pair of beams 3 before described, and supported at an intermediate point upon the plunger 13 of a power cylinder 14. Links 15, similar to the links 8, are provided for limiting the stroke of the plunger 13.

16 designates a horizontally extending overhead support which, in the present instance, is shown as consisting of a box-girder supported at its ends upon the vertical posts or columns 17 and having tracks 18 on its upper surface. Mounted to move on these tracks is a hammer carriage 19 having a depending frame 20, in the lower portion of which is mounted a power hammer 21 of any usual or suitable construction. This power hammer is capable of transverse adjustment, its carriage 22 being mounted on the guides 23 of said depending frame. The carriage 22 may be actuated by any suitable means, such as the screw 24 having the handwheel 25. 26 designates any suitable control lever for the power hammer.

For the purpose of actuating the carriage 19, I have shown a double acting power cylinder 27 having a piston 28 therein, this power cylinder being mounted within the box-girder 16. The piston 28 has its rod or plunger 29 extending through both ends of the cylinder. 30 designates cables which are each fixedly connected at one end to the hammer carriage 19, as shown at 31; the opposite end portions of each of these cables being carried over a guide pulley 32 and thence downwardly and around a set of sheaves 33 and 34. The sheave 34 of each set is connected to one end of the piston rod 29. The arrangement of sheaves is such that a relatively short movement of the piston 28 will effect an increased movement of the carriage 19. The overhead support 16 spans both of the anvils and the carriage 19 is arranged to be moved so as to enable the hammer to be used with both anvils. This range of movement is readily provided for by the means above described.

The operation will be readily understood. The vessel or receptacle to be welded is placed over one of the anvils, in the manner shown in Figures 1 and 3. Suitable heating means of well known character are applied to the portions of the metal to be welded, and the hammer is manipulated to effect welding. After all the welds have been made of one dimension, the receptacle is transferred to the other anvil and the remaining welds are there made in a similar manner.

Any suitable means, such as one or more electromagnets 35, may be provided for holding the object being welded in fixed position during a welding operation.

The advantages of my invention will be apparent since it provides a simple arrangement of apparatus by which the work of welding joints or seams in relatively large sheet metal hollow structures can be rapidly and thoroughly performed with a minimum of manual labor.

I claim:

1. Welding apparatus comprising a support, a member pivotally carried by said support, an anvil mounted on said member, means for raising and lowering said member, and means for limiting said raising movement, substantially as described.

2. Welding apparatus comprising a support, an anvil, a member having the anvil mounted upon one end portion thereof and pivoted at its opposite end portion to said support, and means engaging said member for raising and lowering the anvil, substantially as described.

3. Welding apparatus comprising a support, a member pivoted to said support at one end, an anvil mounted upon the opposite end of said member, and a power cylinder having its plunger engaging and supporting the free end of said member, substantially as described.

4. Welding apparatus comprising a support, a member pivoted at one end to said support, an anvil mounted upon the opposite end of said member, and a power cylinder having its plunger engaging and supporting the free end of said member, together with means for limiting the stroke of said plunger, substantially as described.

5. Welding apparatus comprising a vertically movable anvil, a carriage mounted for longitudinal movement above the anvil, a vertically reciprocable power hammer on said carriage, and separate fluid pressure means for moving said anvil and said carriage, substantially as described.

6. Welding apparatus comprising a vertically movable anvil, a carriage mounted for longitudinal movement above the anvil, and a vertically reciprocable power hammer on said carriage, said hammer being mounted for transverse movement on said carriage, substantially as described.

7. Welding apparatus comprising a pair of vertically movable anvils arranged side by side, an overhead support, a carriage mounted for travel on said support from a position over one of said anvils to a position over the other of said anvils, and a vertically reciprocable power hammer on said carriage, substantially as described.

8. Welding apparatus comprising an overhead support, a carriage mounted thereon, a vertically reciprocable power hammer mounted on the carriage, a power cylinder and piston for actuating the carriage, and movement multiplying connections between the piston of said cylinder and said carriage, substantially as described.

9. Welding apparatus comprising a pair of vertically movable anvils of different dimensions arranged side by side for successive engagement with the same piece of work, an overhead support, a carriage mounted for travel on said support from a position over one of said anvils to a position over the other of said anvils, and a vertically reciprocable power hammer on said carriage, substantially as described.

10. Welding apparatus comprising a pair of vertically movable anvils arranged side by side, an overhead support extending above both of said anvils, a carriage mounted for travel on said support from a position over one of said anvils to a position over the other of said anvils, and a vertically reciprocable power hammer on said carriage, substantially as described.

In testimony whereof I have hereunto set my hand.

WILLIAM P. SHIPMAN.